(12) United States Patent
Gilbert et al.

(10) Patent No.: US 7,673,040 B2
(45) Date of Patent: Mar. 2, 2010

(54) MONITORING OF SERVICE PROVIDER PERFORMANCE

(75) Inventors: Mark Gilbert, Aachen (DE); Olivier Nano, Aachen (DE)

(73) Assignee: Microsoft Corporation, Redmond, WA (US)

( * ) Notice: Subject to any disclaimer, the term of this patent is extended or adjusted under 35 U.S.C. 154(b) by 1163 days.

(21) Appl. No.: 11/244,718

(22) Filed: Oct. 6, 2005

(65) Prior Publication Data

US 2007/0083639 A1    Apr. 12, 2007

(51) Int. Cl.
*G06F 15/173* (2006.01)
*G06F 9/44* (2006.01)
*G06F 17/50* (2006.01)

(52) U.S. Cl. .......................... 709/224; 709/223; 705/7; 705/35

(58) Field of Classification Search ......... 709/217–228; 705/35, 7
See application file for complete search history.

(56) References Cited

U.S. PATENT DOCUMENTS

| | | | |
|---|---|---|---|
| 6,311,175 B1 | 10/2001 | Adriaans et al. | 706/25 |
| 6,510,463 B1 | 1/2003 | Farhat et al. | 709/224 |
| 6,738,813 B1 | 5/2004 | Reichman | 709/224 |
| 6,801,940 B1 | 10/2004 | Moran et al. | 709/224 |
| 7,082,463 B1 * | 7/2006 | Bradley et al. | 709/223 |
| 7,433,838 B2 * | 10/2008 | Welsh et al. | 705/35 |
| 2005/0010456 A1 * | 1/2005 | Chang et al. | 705/7 |
| 2006/0064486 A1 * | 3/2006 | Baron et al. | 709/224 |
| 2009/0080336 A1 * | 3/2009 | Zhang et al. | 370/248 |

OTHER PUBLICATIONS

Andrieux, A. et al., Web Services Agreement Specification (WS-Agreement), May 14, 2004, Draft 18, Version 1.1, IBM's Web Service Level Agreement Project, Global Grid Forum © 2003, 2004, 47 pages.

\* cited by examiner

*Primary Examiner*—Haresh N Patel
(74) *Attorney, Agent, or Firm*—Woodcock Washburn LLP

(57) ABSTRACT

Monitoring of service provider performance is improved by providing detailed instructions for evaluating metrics relating to categories in which the service provider's performance is to be measured. Such instructions describe the metrics in sufficient detail such that they can be evaluated by a monitoring component without having to obtain monitoring data from the service provider, thereby decreasing the level of trust that must be placed in the service provider to monitor itself. The ability to evaluate metrics independent of service provider monitoring data further reduces the size of code which must be generated for the service provider and the number of tasks which must be performed by the service provider, thereby decreasing operating expenses and freeing up resources for other aspects of the service provider's operations.

10 Claims, 6 Drawing Sheets

(Prior Art)

Fig. 3

Metric 300

<response time>
    <probe start time>
    <probe end time>
    <function, subtract>

<probe incoming>
    <probe start time>
    date.time.now

<probe outgoing>
    <probe end time>
    date.time.now

Fig. 4

| Metric 400 |
|---|

<map>
    <probe valid latitude / longitude>
    <probe map detail, map dimension, map size>

<probe incoming>
    < probe valid latitude / longitude >
    Xpath [soapbody / map / latitude]
    Xpath [soapbody / map / longitude]

<probe outgoing>
    < probe map detail, map width, map height>
    Xpath [soapbody / map / map data/map detail]
    Xpath [soapbody / map / map data/map width]
    Xpath [soapbody / map / map data/map height]

<criteria>
    <input> latitude
    <function greater than> 1000
<criteria>
    <input> latitude
    <function less than> 2000

| Service Request 108a |
|---|

<soap body>
    <map>
        <latitude, integer>
        24
        < / latitude>
        <longitude, integer>
        34
        < / longitude>
    < / map>
< / soap body>

MONITORING OF SERVICE PROVIDER PERFORMANCE

BACKGROUND

Electronic services such as, for example, web services, are used to provide clients with an increasing quantity and variety of commercial services. Such commercial services may include, for example, news, sports, financial information, entertainment information, photographs, videos, music, maps, legal information, employment information, and information about buying or selling various goods and services. Generally, electronic service providers operate by charging clients a fee for the services which they provide. When a client subscribes to a particular electronic service, the agreement between the service provider and the client is generally described in a service contract. The portion of such a contract that relates to the expected quality of the service is typically described in a document that is referred to as a service level agreement. Representing service level agreements electronically is a recent development driven by the increasing popularity of electronic services.

The service level agreement may include a number of different metrics, which are categories in which the service provider's performance is to be measured. By way of example and not limitation, such metrics may include response time, response size, and response quantity. Another metric may be, for example, availability, which measures how often the service is available to clients. Other metrics may measure the quality of responses. For example, if a service is expected to return images to its clients, the quality of the images may be measured based on factors such as, color quality, depth, accuracy, precision, and pixel counts. For each metric, the service level agreement may include a standard to which the service provider is expected to conform. For example, for a response time metric, the service level agreement may require that the service provider generate responses within 10 seconds of receiving a request from a client.

Each metric may be measured and computed in accordance with a number of individual measurement points herein referred to as probes, which are values that are determined based on interactions between the service provider and its clients. For example, the response time metric may be calculated in accordance with an incoming probe and an outgoing probe. The incoming probe may correspond to the time at which a service request from a client is received at the service provider. The outgoing probe may correspond to the time at which a response to the service request is returned from the service provider to the requesting client. The response time metric may then be calculated by subtracting the incoming probe value from the outgoing probe value.

In addition to measuring the service provider's performance, probes may also be used to ensure that clients are submitting valid requests to the service provider. For example, if a service provider has entered into an agreement to provide maps of Europe to a client, then the service provider should not be penalized for failing to provide a response when the client requests a map of the United States. Thus, for example, a map metric may have a corresponding incoming probe which confirms that the client has requested a valid latitude and longitude within the area that the service provider has agreed to. Probes that measure the service provider's responses may be referred to as provider response probes, while probes that confirm that the client is requesting valid data may be referred to as client validation probes.

An exemplary prior art system for monitoring the performance of a service provider is shown in FIG. 1. As shown, a client 103 has entered into a service agreement with service provider 101. Monitoring component 105 uses service level agreement 104 to monitor the performance of service provider 101 to ensure that service provider 101 is conforming to the agreed upon performance standards. Monitoring component 105 may be operated by client 103, service provider 101, or by a third party that is trusted to evaluate the performance of the service provider 101. To enable evaluation of its performance, service provider 101 collects and maintains monitoring data 102. Monitoring data 102 is data that allows service provider 101 to be evaluated according to the metrics set forth in service level agreement 104.

Client 103 may avail itself of the services provided by service provider 101 by submitting a service request 108 to service provider 101. Service request 108 may be, for example, a simple object access protocol (SOAP) packet. Service provider 101 may receive, evaluate, and process request 108, and then eventually return a service response 109 back to client 103. For example, client 103 may submit a service request 108 for a map of the United States, and service provider 101 may then generate and return the map of the United States to client 103 as service response 109. Monitoring component 105 monitors the communications between client 103 and service provider 101 to identify any service requests 108.

When monitoring component 105 identifies a service request 108, monitoring component 105 examines service level agreement 104 to identify any metrics that are implicated by the service request 108. For example, if service request 108 is for a map of the United States, then service request 108 may implicate a map metric that measures map detail, map dimensions, and map size and also confirms that a valid latitude and longitude have been requested by the client 103. Such a service request 108 may also implicate, for example, a service response time metric. Monitoring component 105 may then query monitoring data 102 to obtain the data necessary to evaluate service provider 101 based on the implicated metrics. Generally, instructions for gathering monitoring data 102 and evaluating the metrics are set forth and organized in a service level agreement language.

A limitation of conventional service level agreement languages is that they do not provide sufficient description of metrics to enable monitoring component 105 to compile its own monitoring data from the contents of the service requests 108 and the service responses 109. Rather, conventional service level agreements languages force monitoring component 105 to collect pre-compiled monitoring data 102 from service provider 101 or to collect only prescriptive monitoring data that cannot vary between individual service level agreements. For example, to evaluate the response time metric described above, conventional service level agreement languages may instruct monitoring component 105 to retrieve the incoming probe value and the outgoing probe value from monitoring data 102 at service provider 101. The conventional service level agreement languages will generally only provide enough information to enable monitoring component 105 to identify and collect the probes from service provider 101, without having any understanding of what the probe values represent or how they were determined.

Relying on service provider 101 to compile its own monitoring data 102 creates a number of problems. Obviously, there is a danger that service provider 101 could conceivably tamper with monitoring data 102 to produce results which are more favorable to service provider 101. For example, to decrease its response time metric, service provider 101 could conceivably subtract a number of seconds from the outgoing probe value that it provides to monitoring component 105. To reduce the risk that service provider 101 will employ such tactics, monitoring component 105 or another entity may "audit" service provider 101 to inspect the processes by which it compiles its monitoring data 102 and attempt to verify that such processes are, in fact, legitimate. However, auditing service provider 101 may often prove to be an expensive and time consuming proposition. Moreover, even if service provider 101 is audited and its data compilation procedures are found to be legitimate, there is a danger that service provider 101 will simply change its data compilation procedures after the audit is performed. This danger creates the need for repeated auditing of service provider 101, which further drives up the time and expense of the monitoring process. In addition to these dangers of data tampering, forcing the service provider 101 to generate its own monitoring data increases the size of code that must be generated for service provider 101 and the number of tasks that must be performed by service provider 101, thereby increasing operating expenses and diverting resources from other aspects of the service provider's operations.

SUMMARY

Monitoring of service provider performance is improved by providing detailed instructions for evaluating metrics relating to categories in which the service provider's performance is to be measured. Such instructions describe the metrics in sufficient detail such that they can be evaluated by a monitoring component without having to obtain monitoring data from the service provider, thereby decreasing the level of trust that must be placed in the service provider to monitor itself. The ability to evaluate metrics independent of service provider monitoring data further reduces the size of code which must be generated for the service provider and the number of tasks which must be performed by the service provider, thereby decreasing operating expenses and freeing up resources for other aspects of the service provider's operations.

The metric evaluation instructions may be comprised in a service level agreement and may be defined using, for example, extensible markup language (XML). For each metric, the instructions may specify how to calculate values of one or more probes by intercepting and evaluating communications between the service provider and its clients. In some cases, the value of the probes may be calculated without examining the contents of the communications. In other cases, the value of the probes may be calculated by querying the communications to examine their contents. Such queries may be defined, for example, as extensible markup language path (Xpath) statements.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The illustrative embodiments will be better understood after reading the following detailed description with reference to the appended drawings, in which:

FIG. 3 depicts an exemplary detailed metric;

FIG. 4 depicts an exemplary detailed metric with embedded queries and an exemplary corresponding service request;

DETAILED DESCRIPTION

Figure 1:
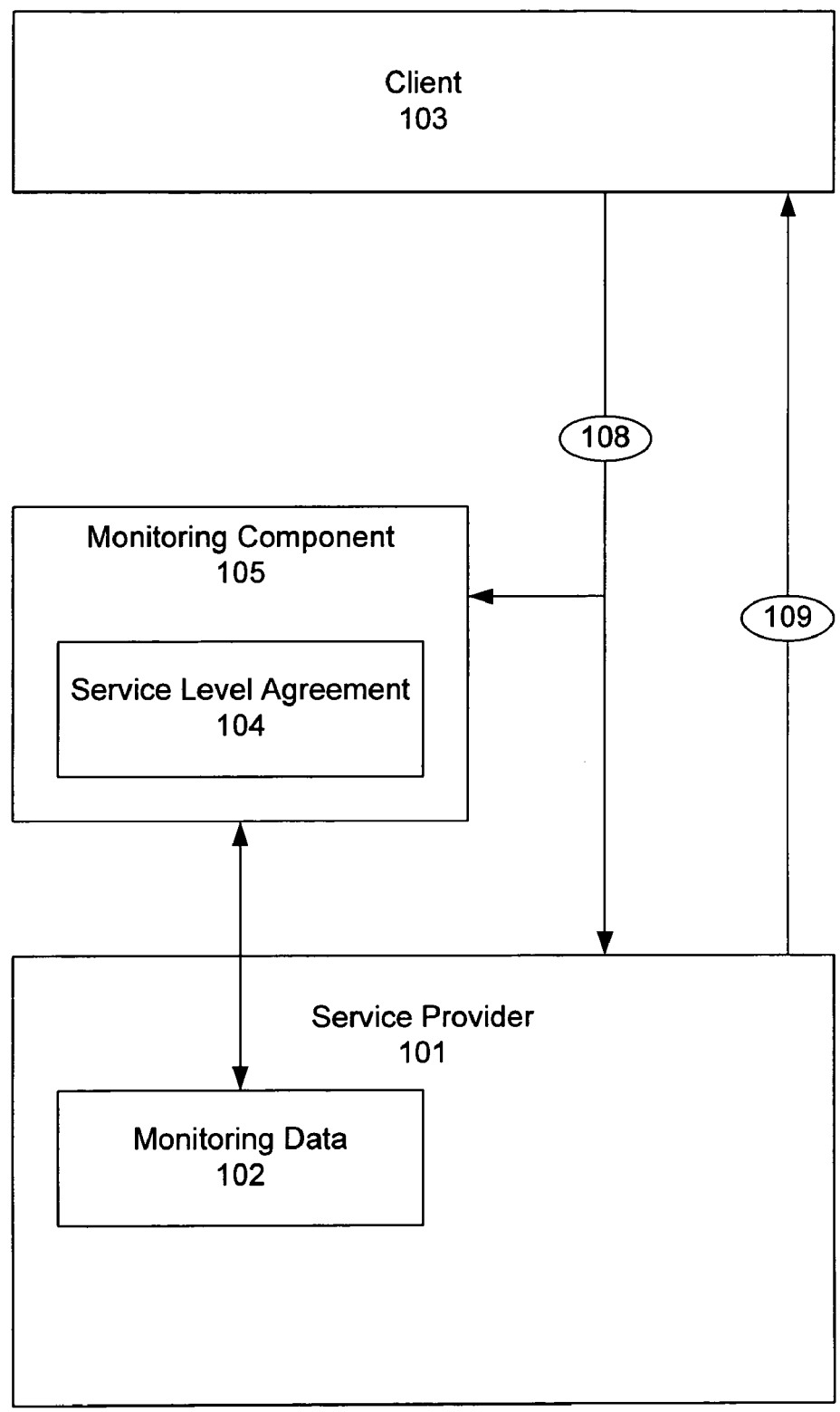
FIG. 1 depicts an exemplary prior art system for monitoring the performance of a service provider.
Figure 2:
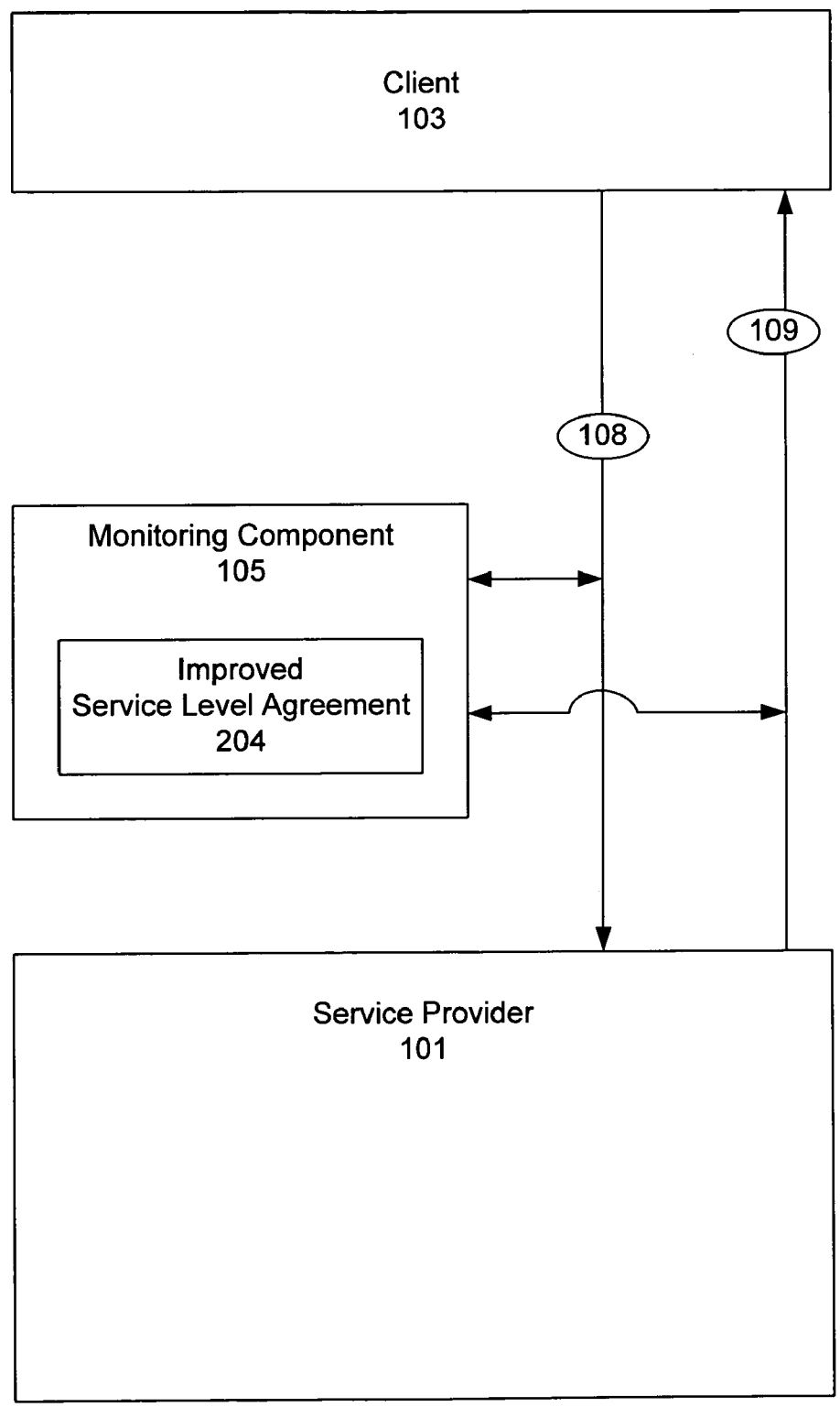
FIG. 2 depicts an exemplary system for improved monitoring of the performance of a service provider.

An exemplary system for improved monitoring of the performance of a service provider is shown in FIG. 2. Unlike the prior art system of FIG. 1, service provider 101 does not collect and store monitoring data, and monitoring component 105 does not query service provider 101 to obtain such monitoring data. Rather, in the improved system of FIG. 2, monitoring component 105 evaluates metrics by intercepting and evaluating data from service request 108 and service response 109. The ability to evaluate metrics independent of service provider monitoring data decreases the level of trust that must be placed in the service provider 101 to monitor itself. Furthermore, the size of code which must be generated for service provider 101 and the number of tasks which must be performed by service provider 101 are reduced, thereby decreasing operating expenses and freeing up resources for other aspects of the service provider's operations.

The ability to monitor service provider 101 without service provider monitoring data may be accomplished using an improved service level agreement 204, which describes the metrics in greater detail than prior art service level agreement 104. In particular, while prior art service level agreement 104 merely instructed monitoring component 105 to obtain probe values from service provider monitoring data, improved service level agreement 204 provides detailed instructions for monitoring component 105 to calculate probe values based on communications 108 and 109.

An exemplary detailed metric 300 that may be included within improved service level agreement 204 is shown in FIG. 3. Metric 300 relates to monitoring how much time it takes service provider 101 to respond to a service request 108. While metric 300 is defined using extensible markup language (XML), other languages may also be used. The first line of metric 300 indicates that the metric is named "response time". Lines 2-4 indicate that the "response time" metric 300 is calculated by subtracting the value of "probe start time" from the value of "probe end time". Lines 5-7 provide detailed instructions as to how calculate the value of "probe start time". Specifically, lines 5 and 6 indicate that "probe start time" is an incoming probe, meaning that its value is to be calculated based on service request 108. Also, line 7 indicates that the value of "probe start time" is to be set to the date and time at which service request 108 is intercepted by monitoring component 105. Lines 8-10 provide detailed instructions as to how calculate the value of "probe end time". Specifically, lines 8 and 9 indicate that "probe end time" is an outgoing probe, meaning that its value is to be calculated based on service response 109. Also, line 10 indicates that the value of "probe end time" is to be set to the date and time at which service response 109 is intercepted by monitoring component 105.

The probe values within response time metric 300 are based on the times at which communications 108 and 109 are intercepted by monitoring component 105. Thus, the probe values within response time metric 300 are not based on the actual contents of communications 108 and 109. However, other metrics may be based on the contents of communications 108 and 109. Such metrics may, for example, measure the quality of the contents of service response 109 based on factors such as size, dimensions, color, pixel count, etc. The value of such metrics may be calculated by querying the contents of service response 109. Such queries may be generated, for example, based on an extensible markup language path (Xpath) statements that are embedded within the probe definitions.

An example of a detailed metric 400 with embedded queries and a corresponding service request 108a is shown in FIG. 4. Service request 108a is a request for a map, and metric 400 monitors the performance of service provider 101 in connection with request 108a. While service request 108a is a simple object access protocol (SOAP) packet request, service requests may also be defined in protocols other than SOAP protocol. As shown, service request 108a provides a schema that specifies a latitude, "24", and a longitude "34", at which the requested map is to be centered. As should be appreciated, service request 108a may also specify a number of other requested characteristics.

The first line of metric 400 indicates that the metric is named "map". Lines 2 and 3 indicate that the "map" metric is calculated based on the value of "probe valid latitude/longitude" and the value of "probe map detail, map width, map height". Lines 4-7 provide detailed instructions as to how calculate the value of "probe valid latitude/longitude". Specifically, lines 4 and 5 indicate that "probe valid latitude/ longitude" is an incoming probe, meaning that its value is to be calculated based on service request 108a. Lines 6 and 7 indicate that the value of "probe valid latitude/longitude" is calculated by querying the contents of service request 108a using two embedded Xpath statements. The first Xpath statement provides instructions for navigating the schema of request 108a to obtain the requested latitude. The second Xpath statement provides instructions for navigating the schema of request 108a to obtain the requested longitude.

Lines 8-12 provide detailed instructions as to how calculate the value of "probe map detail, map width, map height". Specifically, lines 8 and 9 indicate that "probe map detail, map width, map height" is an outgoing probe, meaning that its value is to be calculated based on service response 109. Lines 10-12 indicate that the value of "probe map detail, map width, map height" is calculated by querying the contents of a service request 109 using three embedded Xpath statements. The first Xpath statement provides instructions for navigating the schema of response 109 to obtain the requested map detail. The second Xpath statement provides instructions for navigating the schema of request 109 to obtain the requested map width. The third Xpath statement provides instructions for navigating the schema of request 109 to obtain the requested map height.

Lines 13-18 provide detailed instructions for evaluating the validity of service request 108a. In particular, lines 14 and 15 provide instructions for evaluating the validity of the requested latitude. Specifically, line 15 indicates that the latitude must be greater than 1000. Additionally, lines 17 and 18 provide instructions for evaluating the validity of the requested longitude. Specifically, line 18 indicates that the longitude must be less than 2000. While not shown in FIG. 4, metric 400 may also include other criteria for evaluating service response 109. Although metric 400 includes greater than and less than criteria, a variety of other simple and complex criteria may be used to validate values and to determine whether service level agreements are being complied with. Such criteria may include, for example, but not limited to, mathematical, statistical, aggregation, and other functions.

Figure 5:
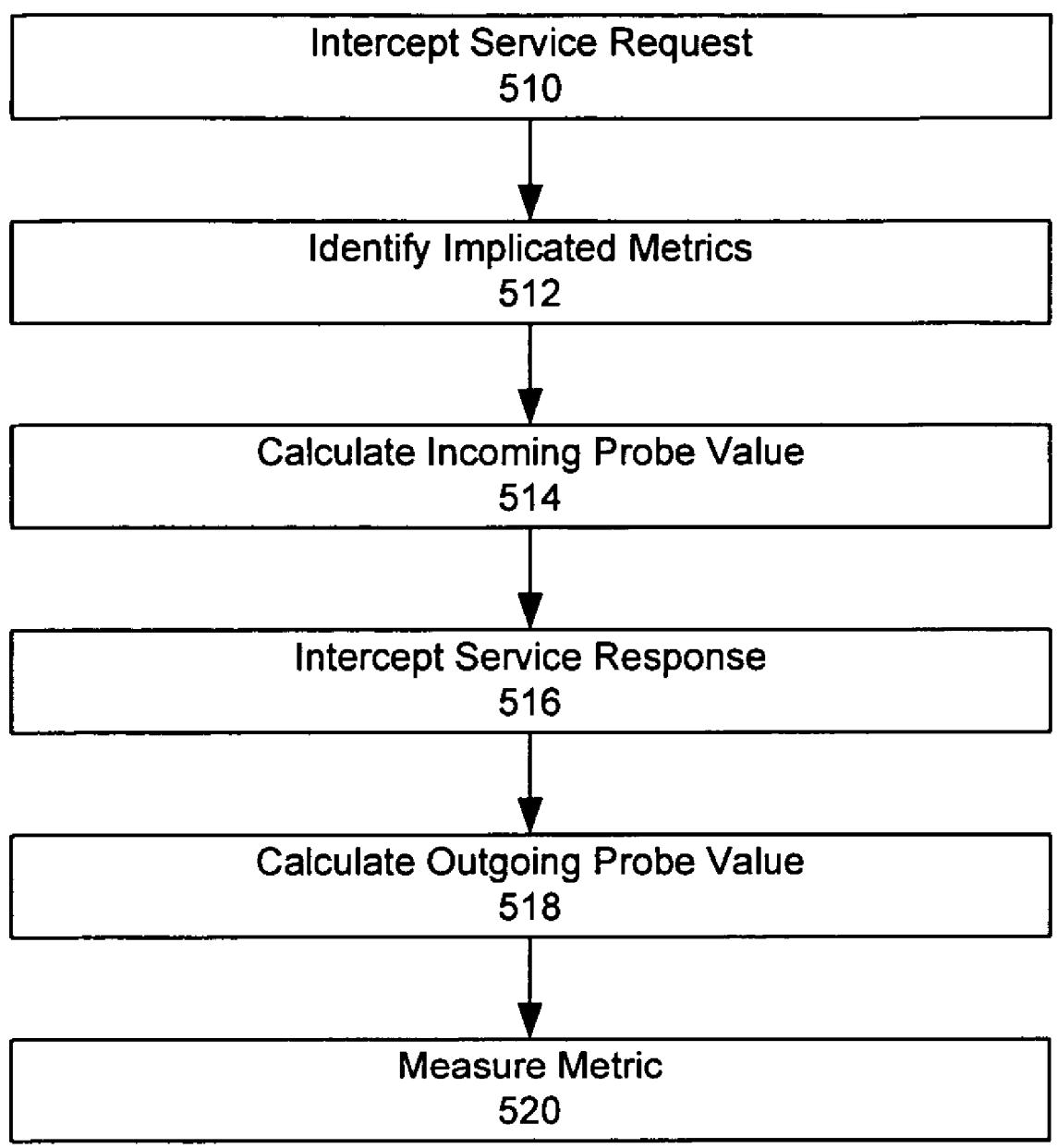
FIG. 5 is a flowchart of an exemplary method for improved monitoring of the performance of a service provider.

A flowchart of an exemplary method for improved monitoring of the performance of a service provider is shown in FIG. 5. At act 510, monitoring component 105 intercepts service request 108. Service request 108 may be any request for data from service provider 101 such as, for example, a request for news, sports, financial information, entertainment information, photographs, videos, music, maps, etc. Service request 108 may be, for example, a simple object access protocol (SOAP) packet. At act 512, monitoring component 105 evaluates service request 108 to identify one or more metrics within service level agreement 204 that are implicated by the service request 108. For example, if service request 108 is for a map of the United States, then service request 108 may implicate map metric 400 of FIG. 4, response time metric 300 of FIG. 3, and possibly other metrics.

At act 514, monitoring component 105 evaluates service request 108 to determine incoming probe values for each implicated metric. Each metric need not necessarily have an incoming probe, and, if there are no incoming probes for any of the implicated metrics, then act 514 may be skipped. Also, certain metrics may have more than one incoming probe. As set forth above, improved service level agreement 204 provides detailed instructions for calculating the incoming probe values from service request 108 without the need to obtain monitoring data from service provider 101. In certain circumstances, monitoring component 105 may be able to calculate incoming probe values without examining the contents of service request 108. For example, response time metric 300 will instruct monitoring component 105 to identify a date and time at which it receives service request 108 and to set that value as the incoming probe value. In other circumstances, monitoring component 105 may calculate incoming probe values by querying service request 108 to examine its contents. For example, map metric 400 will instruct monitoring component 105 to query service request 108 to obtain a requested latitude and longitude.

At act 516, monitoring component 105 intercepts service response 109, and, at act 518, monitoring component 105 evaluates service response 109 to determine outgoing probe values for each implicated metric. Each metric need not necessarily have an outgoing probe, and, if there are no outgoing probes for any of the implicated metrics, then act 516 may be skipped. Also, certain metrics may have more than one outgoing probe. Also, in certain circumstances, service provider 101 may fail to generate a response 109, which would render service provider 101 in non-compliance with the response time metric 300 and possibly other metrics, provided that client 103 has requested valid data.

As set forth above, improved service level agreement 204 provides detailed instructions for calculating the outgoing probe values from service response 109 without the need to obtain monitoring data from service provider 101. In certain circumstances, monitoring component 105 may be able to calculate outgoing probe values without examining the contents of service response 109. For example, response time metric 300 will instruct monitoring component 105 to identify a date and time at which it receives service response 109 and to set that value as the outgoing probe value. In other circumstances, monitoring component 105 may calculate outgoing probe values by querying service response 109 to examine its contents. For example, map metric 400 will instruct monitoring component 105 to query service response 109 to calculate map detail, map dimensions, and map size.

At act 520, monitoring component 105 measures the implicated metrics in accordance with the incoming and/or outgoing probe values. As set forth above, improved service level agreement 204 provides detailed instructions for measuring the implicated metrics. In certain circumstances, the metrics may be measured by performing a mathematical operation on the probe values. For example, response time metric 300 will instruct monitoring component 105 to measure the response time by subtracting the "probe start time" from the "probe end time". The measured response time may then be compared with a target response time to which service provider 101 is expected to comply. If the measured response time is greater than the target response time, then service provider 101 may be in non-compliance with response time metric 300. Alternatively, if the measured response time is less than or equal to the target response time, then service provider 101 may be in compliance with response time metric 300. In addition to measuring metrics when a service response 109 is intercepted, monitoring component 105 may also measure metrics at other times. For example, monitoring component 105 may measure metrics at scheduled intervals, as a running total throughout a day, or after receiving a pre-determined number of service requests 108. Also, any number of other events may trigger monitoring component 105 to measure metrics.

With respect to map metric 400, it has an outgoing probe that calculates map detail, map dimensions, and map size from response 109. Those measured values may be compared to a target map detail, map dimensions, and map size. If the measured values do not comply with the agreed upon target values, then service provider 101 may be found in non-compliance with map metric 400. Map metric 400 also has an incoming probe which identifies the latitude and longitude requested by client 103. Those values may be compared with target values to determine whether the client has requested a valid map. If the client has not requested a valid map, then the service provider will not be considered non-compliant even if it has failed to provide a response or its response would otherwise be considered non-compliant.

In certain circumstances, such as with response time metric 300, monitoring component 105 may be evaluating service provider 101 based on the time at which service provider 101 receives service request 108 and submits service response 109. However, because monitoring component 101 does not query service provider 101, monitoring component 101 has no way of knowing exactly when service provider 101 receives service request 108 and submits service response 109. Rather, monitoring component 105 can only estimate the "travel time" that it takes for communications to travel between monitoring component 105 and service provider 101. Monitoring component 105 may estimate this travel time by pinging service provider 101, and may then use this estimated travel time to calculate more precise probe values.

Monitoring component 105 may ping service provider 101 periodically at a set interval. Monitoring component 105 may also ping service provider 101 in response to a command from a user or another event. Monitoring component 105 may also ping service provider 101 whenever monitoring component 105 intercepts service request 108 or service response 109. Generally, the more frequently service provider 101 is pinged, the better the estimate of the travel time will be. When service provider 101 and monitoring component 105 are connected over a network with a higher risk of disturbances such as, for example, the Internet, it may be necessary to ping service provider 101 more frequently. Frequent pinging of service provider 101 may help to identify periodic disturbances that may cause a slowdown or even a complete outage of the network. Alternatively, when service provider 101 and monitoring component 105 are connected over a network with a lower risk of disturbances such as, for example, a local area network (LAN), it may not be necessary to ping service provider 101 as frequently.

To illustrate how monitoring component 105 uses the estimated travel time to provide more precise probe values, consider response time metric 300. Specifically, as shown in FIG. 3, the "probe start time" is calculated based on the date and time at which service request 108 is intercepted by monitoring component 108. However, to provide a more precise "probe start time", a current estimated travel time may be added to the time at which monitoring component 105 intercepts service request 108, thereby estimating the time at which service request 108 will be received by service provider 101. Also, as shown in FIG. 3, the "probe end time" is calculated based on the date and time at which service response 109 is intercepted by monitoring component 108. However, to provide a more precise "probe end time", a current estimated travel time may be subtracted from the time at which monitoring component 105 intercepts service response 109, thereby estimating the time at which service response 109 was submitted from service provider 101.

Although the description of FIGS. 2-5 refers to an improved service level agreement 204, the improved detailed metrics described above need not necessarily be comprised within a service level agreement. Rather, the improved detailed metrics may be specified in any type of computer readable media or document. Also, although the description of FIGS. 2-5 refers to a single service request 108 and service response 109, the improved detailed metrics may be used in connection with any number of service requests and service responses or any number of other communications between client 103 and service provider 101.

Figure 6:
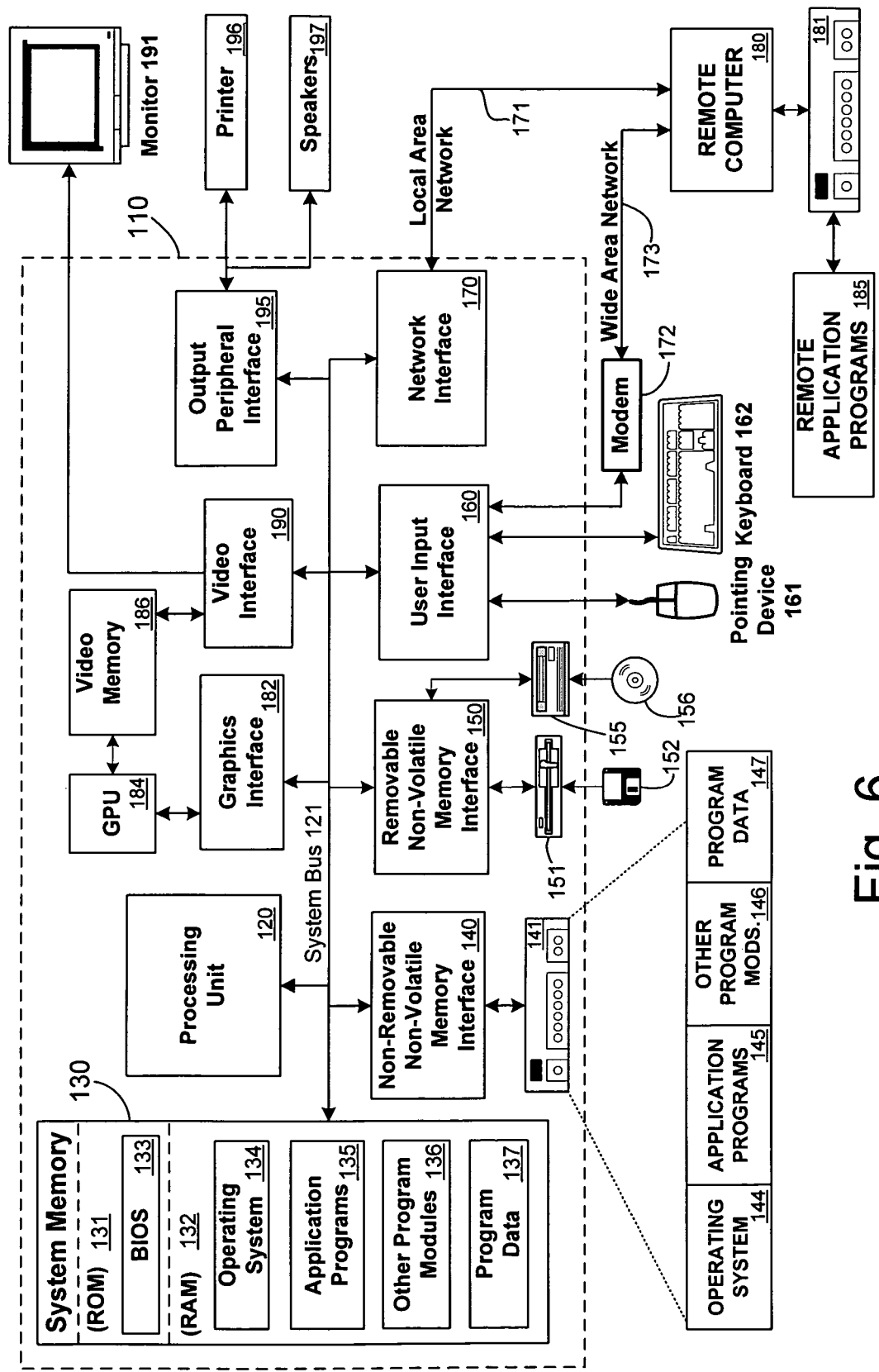
FIG. 6 is a block diagram representing an exemplary computing device.

FIG. 6 illustrates an example of a suitable computing system environment 100 in which the subject matter described above with reference to FIGS. 2-5 may be implemented. The computing system environment 100 is only one example of a suitable computing environment and is not intended to suggest any limitation as to the scope of use or functionality of the subject matter described above. Neither should the computing environment 100 be interpreted as having any dependency or requirement relating to any one or combination of components illustrated in the exemplary operating environment 100.

With reference to FIG. 6, computing system environment 100 includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embody computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 6 illustrates operating system 134, application programs 135, other program modules 136, and program data 137.

The computer 110 may also include other removable/non-removable, volatile/nonvolatile computer storage media. By way of example only, FIG. 6 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-RW, DVD-RW or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 6 provide storage of computer readable instructions, data structures, program modules and other data for the computer 110. In FIG. 6, for example, hard disk drive 141 is illustrated as storing operating system 144, application programs 145, other program modules 146 and program data 147. Note that these components can either be the same as or different from operating system 134, application programs 135, other program modules 136 and program data 137. Operating system 144, application programs 145, other program modules 146 and program data 147 are given different numbers here to illustrate that, at a minimum, they are different copies. A user may enter commands and information into the computer 110 through input devices such as a keyboard 162 and pointing device 161, such as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182 may also be connected to the system bus 121. One or more graphics processing units (GPUs) 184 may communicate with graphics interface 182. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 6. The logical connections depicted in FIG. 6 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 6 illustrates remote application programs 185 as residing on memory device 181. It will be appreciated that the network connections shown are exemplary and other means of establishing a communications link between the computers may be used.

Although the subject matter has been described in language specific to the structural features and/or methodological acts, it is to be understood that the subject matter defined in the appended claims is not necessarily limited to the specific features or acts described above. Rather, the specific features or acts described above are disclosed as example forms of implementing the claims.

What is claimed:

1. A system for monitoring performance of a service provider, the system comprising:
   a memory having stored therein computer-executable instructions;
   a computer processor that executes the computer-executable instructions;
   a monitoring component that monitors the service provider's compliance with a service level agreement metric that is measured in accordance with a probe, the monitoring component being independent of a client and the service provider and being in communication with a network apart from the client and the service provider; and
   instructions for calculating a value of the probe by intercepting and evaluating a communication in the network between the client and the service provider without having to query the service provider for monitoring data, wherein the instructions enable the monitoring component to calculate the value of the probe without examining the contents of the communication;

the metric is measured in accordance with an incoming probe and an outgoing probe, the incoming probe having a value that is calculating by intercepting and evaluating a service request from the client to the service provider, the outgoing probe having a value that is calculating by intercepting and evaluating a service response from the service provider to the client.

2. The system of claim 1, wherein the instructions are comprised within a service level agreement.

3. The system of claim 1, wherein the monitoring component evaluates the service request to determine which of a plurality of metrics are implicated by the service request.

4. The system of claim 1, wherein the instructions are defined using extensible markup language.

5. The system of claim 1, further comprising a command to query contents of the communication between the client and the service provider to calculate the value of the incoming probe.

6. The system of claim 5, wherein the command is an extensible markup language path statement.

7. The system of claim 1, wherein the metric is measured by applying a mathematical function to the probe.

8. The system of claim 1, wherein the monitoring component pings the service provider to estimate a travel time for network communications between the monitoring component and the service provider.

9. A non-transitory computer storage medium having stored thereon computer-executable instructions for performing steps comprising:

using a monitoring component to intercept a network communication between a client and a service provider, the monitoring component being independent of the client and the service provider and being in communication with a network apart from the client and the service provider, wherein the network communication is a service request from the client to the service provider;

intercepting a service response from the service provider to the client;

evaluating the service response to calculate a value of an outgoing probe;

evaluating the network communication to calculate a value of a probe; and measuring the service provider's compliance with a service level agreement metric in accordance with the value of the incoming probe and the value of the outgoing probe, and in accordance with instructions that enable the monitoring component to calculate the value of the probe without examining the contents of the network communication;

the evaluating the network communication to calculate the value of the probe comprises evaluating the service request to calculate a value of an incoming probe.

10. The computer storage medium of claim 9, having further computer-executable instructions for performing the step of evaluating the service request to determine which of a plurality of metrics are implicated by the service request.

* * * * *

UNITED STATES PATENT AND TRADEMARK OFFICE
CERTIFICATE OF CORRECTION

| | | |
|---|---|---|
| PATENT NO. | : 7,673,040 B2 | Page 1 of 1 |
| APPLICATION NO. | : 11/244718 | |
| DATED | : March 2, 2010 | |
| INVENTOR(S) | : Mark Gilbert et al. | |

It is certified that error appears in the above-identified patent and that said Letters Patent is hereby corrected as shown below:

In column 10, line 59, in Claim 1, delete "a" and insert -- an incoming probe and an outgoing --, therefor.

In column 10, line 64, in Claim 1, before "instructions" insert -- the --.

In column 10, line 64, in Claim 1, after "value of the" insert -- incoming probe and the outgoing --.

In column 10, line 65, in Claim 1, after "evaluating" delete "a".

In column 10, line 65, in Claim 1, delete "communication" and insert -- communications --, therefor.

In column 11, line 2, in Claim 1, after "value of the" insert -- incoming probe and the outgoing --.

In column 11, line 3, in Claim 1, delete "communication" and insert -- communications --, therefor.

In column 11, lines 4-5, in Claim 1, before "the incoming probe" delete "the metric is measured in accordance with an incoming probe and an outgoing probe,".

In column 11, line 6, in Claim 1, delete "calculating" and insert -- calculated --, therefor.

In column 11, line 8, in Claim 1, delete "calculating" and insert -- calculated --, therefor.

In column 12, line 16, in Claim 9, delete "a" and insert -- an incoming --, therefor.

In column 12, lines 23-26, in Claim 9, after "communication" delete ";the evaluating the network communication to calculate the value of the probe comprises evaluating the service request to calculate a value of an incoming probe".

Signed and Sealed this
Seventeenth Day of May, 2011

David J. Kappos
*Director of the United States Patent and Trademark Office*